US011916385B2

(12) United States Patent
Shionozaki

(10) Patent No.: US 11,916,385 B2
(45) Date of Patent: Feb. 27, 2024

(54) INFORMATION PROCESSING DEVICE AND INFORMATION PROCESSING METHOD

(71) Applicant: SONY CORPORATION, Tokyo (JP)

(72) Inventor: Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1070 days.

(21) Appl. No.: 16/336,394

(22) PCT Filed: Sep. 5, 2017

(86) PCT No.: PCT/JP2017/031981
§ 371 (c)(1),
(2) Date: Mar. 25, 2019

(87) PCT Pub. No.: WO2018/100824
PCT Pub. Date: Jun. 7, 2018

(65) Prior Publication Data
US 2019/0272771 A1    Sep. 5, 2019

(30) Foreign Application Priority Data

Nov. 29, 2016 (JP) .................................. 2016-231521

(51) Int. Cl.
*G09B 19/00* (2006.01)
*H02J 3/14* (2006.01)
(Continued)

(52) U.S. Cl.
CPC ................ *H02J 3/14* (2013.01); *G01C 21/34* (2013.01); *G01C 21/3407* (2013.01);
(Continued)

(58) Field of Classification Search
CPC .......... H02J 3/14; H02J 13/00; H02J 2310/58; G01C 21/34; G01C 21/3407;
(Continued)

(56) References Cited

U.S. PATENT DOCUMENTS

| 2015/0066607 A1* | 3/2015 | Fiorucci ............. G06Q 30/0234 705/13 |
| 2015/0206166 A1 | 7/2015 | Fletcher et al. |
| 2017/0228773 A1 | 8/2017 | Takayama |

FOREIGN PATENT DOCUMENTS

| AU | 2013349305 A1 | 7/2015 |
| CA | 2892367 A1 | 5/2014 |

(Continued)

OTHER PUBLICATIONS

Office Action for JP Patent Application No. 2018-553666 dated Jun. 22, 2021, 03 pages of Office Action and 03 pages of English Translation.
International Search Report and Written Opinion of PCT Application No. PCT/JP2017/031981, dated Oct. 10, 2017, 07 pages of ISRWO.

*Primary Examiner* — Kim T Nguyen
(74) *Attorney, Agent, or Firm* — CHIP LAW GROUP

(57) ABSTRACT

Provided is an information processing device and an information processing method capable of accumulating indirect resource saving acts, and preferentially providing resources to a user in accordance with accumulation of the acts. The information processing device includes a communication unit that receives information obtained by sensing an action of the user; and a control unit that accumulates, in units of users, action information of indirectly saving resources in a predetermined storage unit on a basis of the information, and performs control, when the user is estimated to desire the resources, to generate a control signal for preferentially providing the resources to the user, and transmits the control signal via the communication unit, in accordance with the accumulated action information of the user.

20 Claims, 14 Drawing Sheets

(51) Int. Cl.
*G01C 21/34* (2006.01)
*G08G 1/14* (2006.01)
*H02J 13/00* (2006.01)
*G08G 1/123* (2006.01)
*G06Q 50/10* (2012.01)

(52) U.S. Cl.
CPC ............ *G06Q 50/10* (2013.01); *G08G 1/123* (2013.01); *G08G 1/14* (2013.01); *G09B 19/00* (2013.01); *H02J 13/00* (2013.01); *Y02B 70/3225* (2013.01); *Y04S 20/222* (2013.01)

(58) Field of Classification Search
CPC .... G01C 21/3438; G06Q 50/10; G08G 1/123; G08G 1/14; G09B 19/00; Y02B 70/3225; Y04S 20/222
See application file for complete search history.

(56) References Cited

FOREIGN PATENT DOCUMENTS

| | | | |
|---|---|---|---|
| CN | 102799162 A | 11/2012 |
| CN | 104813345 A | 7/2015 |
| CN | 105160560 A | 12/2015 |
| CN | 105991861 A | 10/2016 |
| EP | 2923327 A2 | 9/2015 |
| HK | 1212798 A1 | 6/2016 |
| JP | 2002-051462 A | 2/2002 |
| JP | 2011-182555 A | 9/2011 |
| JP | 2015-535629 A | 12/2015 |
| KR | 10-2015-0092199 A | 8/2015 |
| MX | 2015006545 A | 1/2016 |
| WO | 2014/080380 A2 | 5/2014 |
| WO | WO 2014080380 | * | 5/2014 |
| WO | 2016/021157 A1 | 2/2016 |

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/031981 filed on Sep. 5, 2017, which claims priority benefit of Japanese Patent Application No. JP 2016-231521 filed in the Japan Patent Office on Nov. 29, 2016. Each of the above-referenced applications is hereby incorporated herein by reference in its entirety.

TECHNICAL FIELD

The present disclosure relates to an information processing device and an information processing method.

BACKGROUND ART

Conventionally, systems have been proposed in which in the case where use of resources is saved, the resources are obtained preferentially or inexpensively in return.

Specifically, for example, Patent Literature 1 below discloses a method of performing control so that dwelling units with a higher degree of contribution to charging of a shared storage battery can more preferentially receive power supply from the shared storage battery.

In addition, Patent Literature 2 below discloses the following power supply demand system: as evaluation measures of the adequacy of supply control to the demand and consumption side, with respect to a result of work performed on the consumption side, a user evaluates and accumulates its effects (a cost effect such as economical efficiency, s risk-related effect such as credibility or safety, an emotional and sentimental effect such as beautiful or enjoyable, etc.), and a supply control method is decided on the basis of these pieces of information.

CITATION LIST

Patent Literature

Patent Literature 1: JP 2011-182555A
Patent Literature 2: JP 2002-51462A

DISCLOSURE OF INVENTION

Technical Problem

However, resource saving acts are not limited to explicit, direct acts like the degree of contribution to charging of the shared storage battery shown in Patent Literature 1 above, and an act that a user performs in daily life without knowing falls under resource saving acts in some cases.

Hence, the present disclosure proposes an information processing device and an information processing method capable of accumulating indirect resource saving acts, and preferentially providing resources to a user in accordance with accumulation of the acts.

Solution to Problem

According to the present disclosure, there is proposed an information processing device including: a communication unit configured to receive information obtained by sensing an action of a user; and a control unit configured to accumulate, in units of users, action information of indirectly saving resources in a predetermined storage unit on the basis of the information, and perform control, when the user is estimated to desire resources, to generate a control signal for preferentially providing the resources to the user, and transmit the control signal via the communication unit, in accordance with the accumulated action information of the user.

According to the present disclosure, there is proposed an information processing method including, by a processor: receiving, via a communication unit, information obtained by sensing an action of a user; accumulating, in units of users, action information of indirectly saving resources in a predetermined storage unit on the basis of the information; and performing control, when the user is estimated to desire resources, to generate a control signal for preferentially providing the resources to the user, and transmit the control signal via the communication unit, in accordance with the accumulated action information of the user.

Advantageous Effects of Invention

According to the present disclosure as described above, it is possible to accumulate indirect resource saving acts, and preferentially provide resources to a user in accordance with accumulation of the acts.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
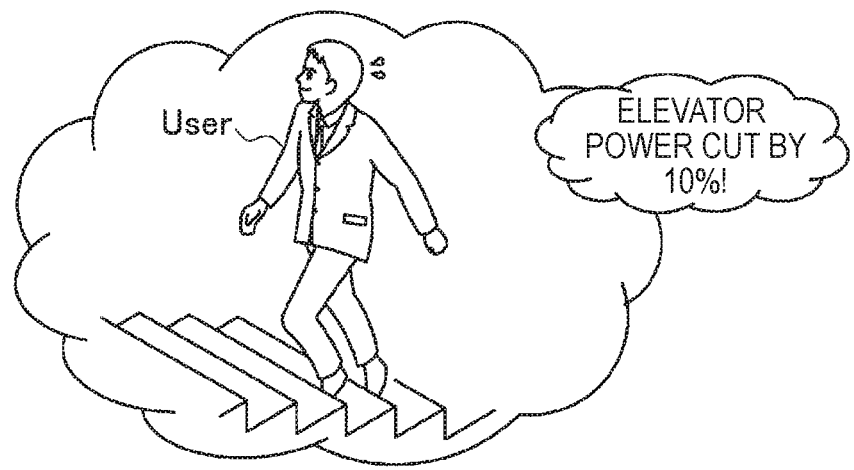
FIG. 1 is a diagram for describing an overview of an information processing system according to an embodiment of the present disclosure.
Figure 1:
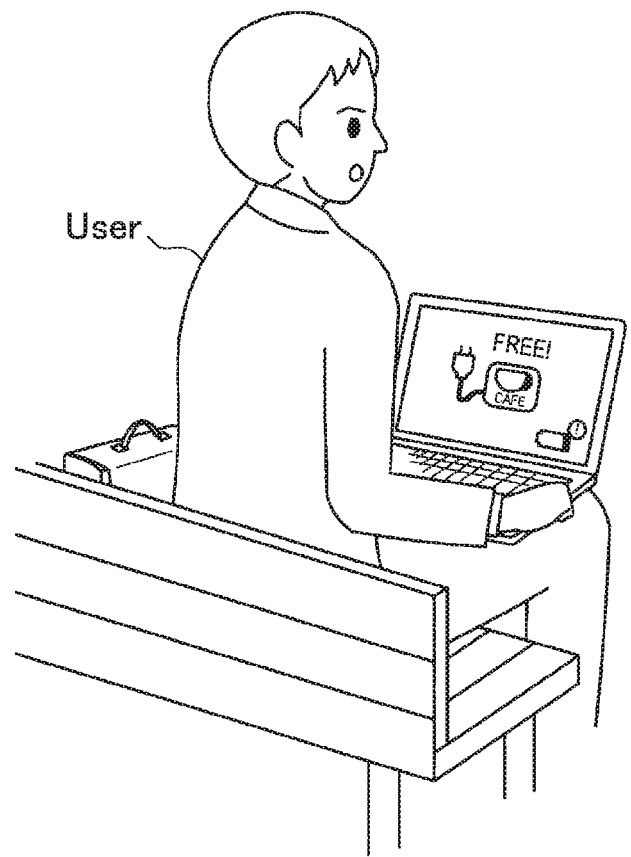

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be given in the following order.

1. Overview of information processing system according to embodiment of present disclosure
2. Configuration
2-1. Overall configuration
2-2. Configuration of sensor device 1
2-3. Configuration of emotion server 2
3. Operation processing
3-1. Registration processing
3-2. Use notification processing
4. Examples
4-1. First example
4-2. Second example
4-3. Third example
4-4. Fourth example
4-5. Others
5. Conclusion

1. Overview of Information Processing System According to Embodiment of Present Disclosure FIG. 1 is a diagram for describing an overview of an information processing system according to an embodiment of the present disclosure. The information processing system according to the present embodiment makes it possible to accumulate indirect resource saving acts performed by a user, and preferentially provide resources in accordance with accumulation of the acts.

For example, as illustrated in FIG. 1, in the case where a user uses stairs without using an elevator for health, electricity corresponding to non-use of the elevator is saved, and it can be said that power resources are indirectly saved even if the user him/herself does not intend power savings. Such user's indirect saving acts are subjected to action recognition by a sensor device 1 (see FIG. 2) such as a smartphone or a wearable terminal owned by the user, and are accumulated in an emotion server 2 (see FIG. 2).

Moreover, in the case where the user is in a state of wanting power resources, such as the time when battery becomes low and urgently needs charging when the user is using a PC (an information processing terminal 4) or the like away from home one day, the emotion server 2 performs control to supply power (preferentially distribute power) if resource saving acts that the user performs from day to day satisfy a predetermined condition. Specifically, as illustrated in FIG. 1 for example, a notification that power supply can be received for free at a café is made on a screen of the PC (the information processing terminal 4) by an icon or the like.

Thus, by evaluation (calculation of an emotion value) and accumulation of indirect resource saving acts that a user performs in daily life without noticing, predetermined resources can be preferentially provided to the user in accordance with the evaluation in the case where the user is in a state of wanting resources.

Here, as resources to be saved in the present embodiment, a variety of resources shared by people in a society, such as a bandwidth, a road, and a parking lot, are assumed in addition to power. The present embodiment proposes a system that preferentially distributes such shared resources in accordance with an emotion value of the person. An emotion value is a new indicator of evaluation of a person calculated on the basis of some sort of action (interaction) performed by the person. In the present embodiment, a person's indirect resource saving act is evaluated as an example of the emotion value, and a saving amount is calculated.

The information processing system according to an embodiment of the present disclosure has been described above. Next, a configuration of the information processing system according to the present embodiment will be described with reference to FIG. 2 to FIG. 4.

2. Configuration

2-1. Overall Configuration

Figure 2:
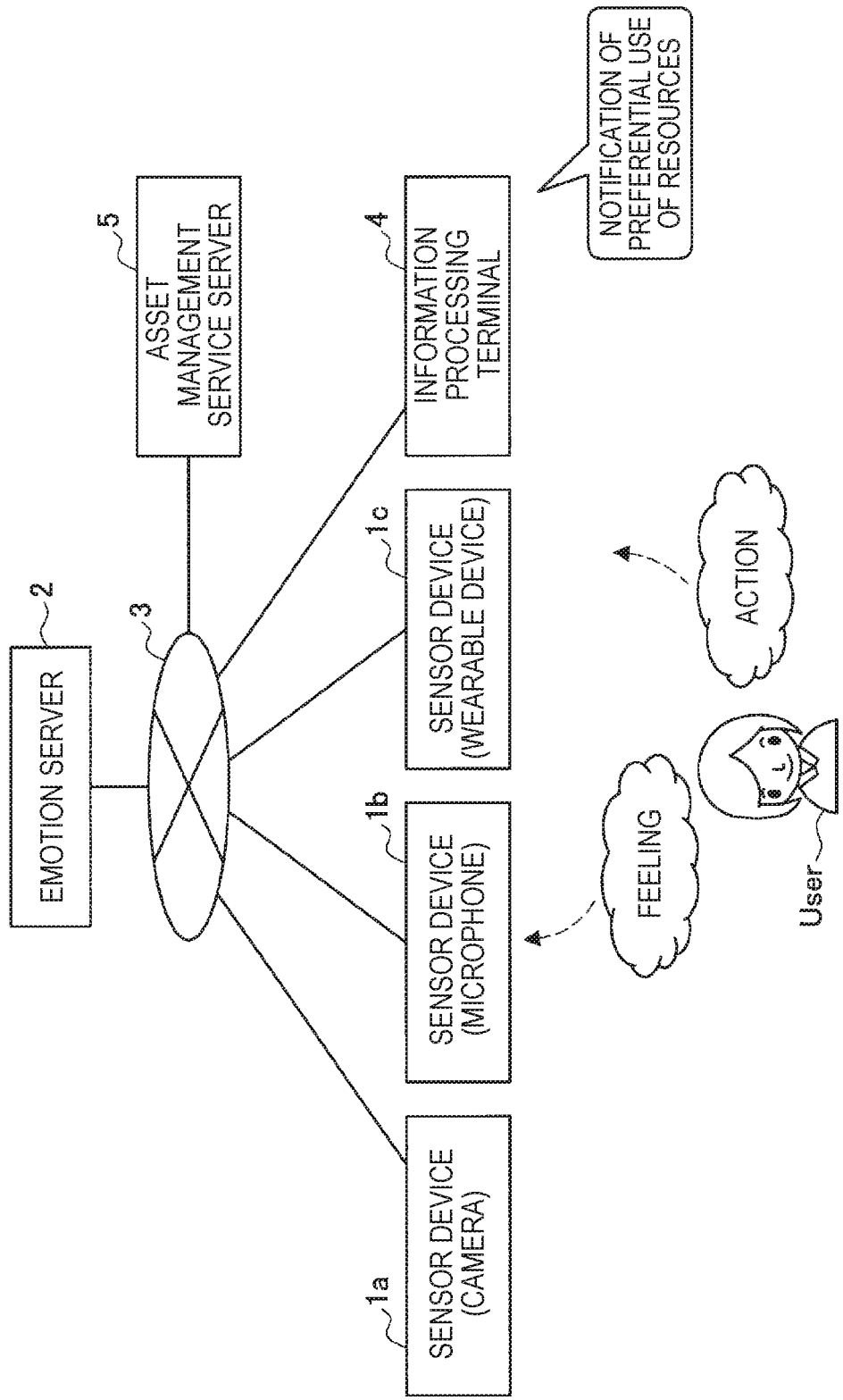
FIG. 2 illustrates an example of an overall configuration of the information processing system according to the present embodiment.

FIG. 2 illustrates an example of an overall configuration of the information processing system according to the present embodiment. As illustrated in FIG. 2, the information processing system according to the present embodiment includes a sensor device 1 (1a to 1c) that recognizes a user's actions and feelings, an emotion server 2 that accumulates evaluation of actions and evaluation results (emotion values), and the user's information processing terminal 4 that performs resource provision notification. The sensor device 1, the emotion server 2, and the information processing terminal 4 are connected via a network 3, and can transmit and receive data.

The sensor device 1 is a device including a sensor that detects various data for recognizing the user's actions and feelings, and transmits a detection result or a recognition result based on the detection result to the emotion server 2. For example, the sensor device 1 may be the sensor device 1a including a camera, the sensor device 1b including a microphone, and the sensor device 1c using a wearable device worn by the user. In addition, the sensor device 1 may recognize the user's actions and feelings by a plurality of sensors. The user's actions and feelings are recognized on a daily basis, and transmitted to the emotion server 2.

The emotion server 2 determines whether or not the user has performed an indirect resource saving action on the basis of daily action recognition results transmitted from the sensor device 1, and calculates (evaluates) a saving amount indicating which and how much resources have been saved, as an emotion value of the action. Moreover, the emotion server 2 accumulates evaluation results (saving amounts) of each user. In this manner, the user's actions are evaluated and accumulated on a daily basis.

Furthermore, on the basis of daily action and feeling recognition results transmitted from the sensor device 1, the emotion server 2 determines whether or not resources can be preferentially given in accordance with the user's saving amount up to the present time in the case where it can be recognized that the user needs some sort of resources. Moreover, in the case of determining that resources can be provided, the emotion server 2 notifies the user that resources can be provided via the information processing terminal 4 and a resource management service server 5.

The information processing terminal 4 is implemented by a smartphone, a wearable device, or the like, and receives resource provision notification from the emotion server 2 or the resource management service server 5.

Thus, in the information processing system according to the present embodiment, in accordance with daily indirect saving acts that a user performs unintentionally, the resources can be preferentially provided when the user is in trouble.

Note that the configuration of the information processing system according to the present embodiment is not limited to the example illustrated in FIG. 2; for example, the information processing terminal 4 may function also as the sensor device 1.

2-2. Configuration of Sensor Device 1

Figure 3:
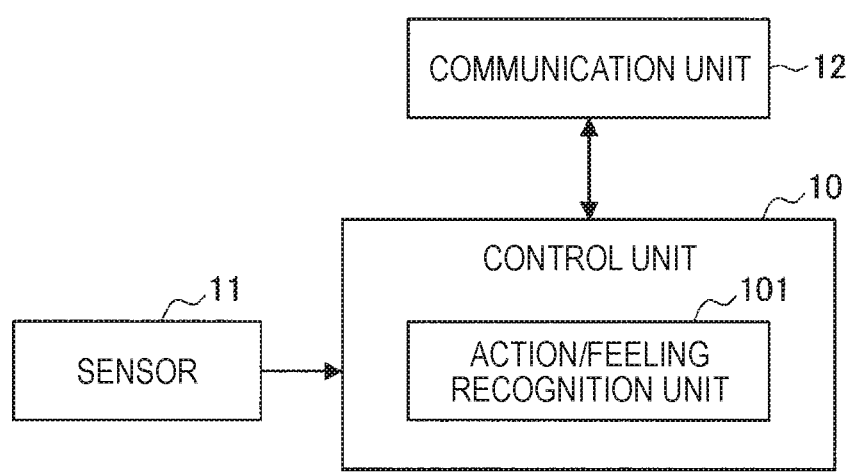
FIG. 3 is a block diagram illustrating an example of a configuration of a sensor device according to the present embodiment.

FIG. 3 is a block diagram illustrating an example of a configuration of the sensor device 1 according to the present embodiment. As illustrated in FIG. 3, the sensor device 1 includes a control unit 10, a sensor 11, and a communication unit 12.

The control unit 10 functions as an arithmetic processing device and a control device, and controls the overall operation of the sensor device 1 in accordance with a variety of programs. The control unit 10 is implemented, for example, by an electronic circuit such as a central processing unit (CPU) and a microprocessor. In addition, the control unit 10 may include a read only memory (ROM) that stores a program, an operation parameter and the like to be used, and a random access memory (RAM) that temporarily stores a parameter and the like varying as appropriate.

In addition, the control unit 10 according to the present embodiment also functions as an action/feeling recognition unit 101. The action/feeling recognition unit 101 analyzes sensing data detected by the sensor 11, and recognizes the user's actions and feelings. As user actions, for example, walking, running, movement using a bicycle, a train, a car, etc., ascending/descending stairs, and the like are recognized. In addition, as user feelings, joy, sadness, anger, resignation, surprise, hate, terror, and the like are recognized. An algorithm of action recognition processing is not particularly limited; for example, an existing algorithm using an acceleration sensor, a gyro sensor, position information, a captured image, voice, biometric information, or the like can be used. Furthermore, the action/feeling recognition unit 101 can also recognize a surrounding situation and the user's state as user actions.

The sensor 11 detects data for recognizing the user's actions and feelings. For example, the sensor 11 is implemented by an acceleration sensor, a gyro sensor, a position measurement unit, a camera, a microphone, a biosensor, an environment sensor, or the like. The position measurement unit, a position measurement unit 16 has a function of detecting the current position of the sensor device 1 on the basis of an externally acquired signal. For example, the position measurement unit is implemented by a global positioning system (GPS) positioning unit, receives radio waves from a GPS satellite, detects the position of the sensor device 1, and outputs the detected position information to the control unit 10. In addition, the position measurement unit may sense the position, for example, in accordance with Wi-Fi (registered trademark), Bluetooth (registered trademark), transmission and reception to and from a mobile phone/PHS/smartphone or the like, short-range communication, or the like in addition to the GPS. In addition, the sensor 11 may include a plurality of sensors.

The communication unit 12 connects to an external device in a wired or wireless manner, and transmits and receives data. For example, the communication unit 12 continuously transmits recognition results of the user's daily actions recognized by the action/feeling recognition unit 101 to the emotion server 2 via the network 3. For example, the communication unit 12 connects by communication to the external device by a wired/wireless local area network (LAN), Wi-Fi (registered trademark), Bluetooth (registered trademark), or the like.

The configuration of the sensor device 1 according to the present embodiment has been specifically described above. Note that the configuration of the sensor device 1 according to the present embodiment is not limited to the example illustrated in FIG. 3; for example, sensing data detected by the sensor 11 may be transmitted from the communication unit 12 to the emotion server 2, and action and feeling recognition processing may be performed in the emotion server 2.

2-3. Configuration of Emotion Server 2

Figure 4:
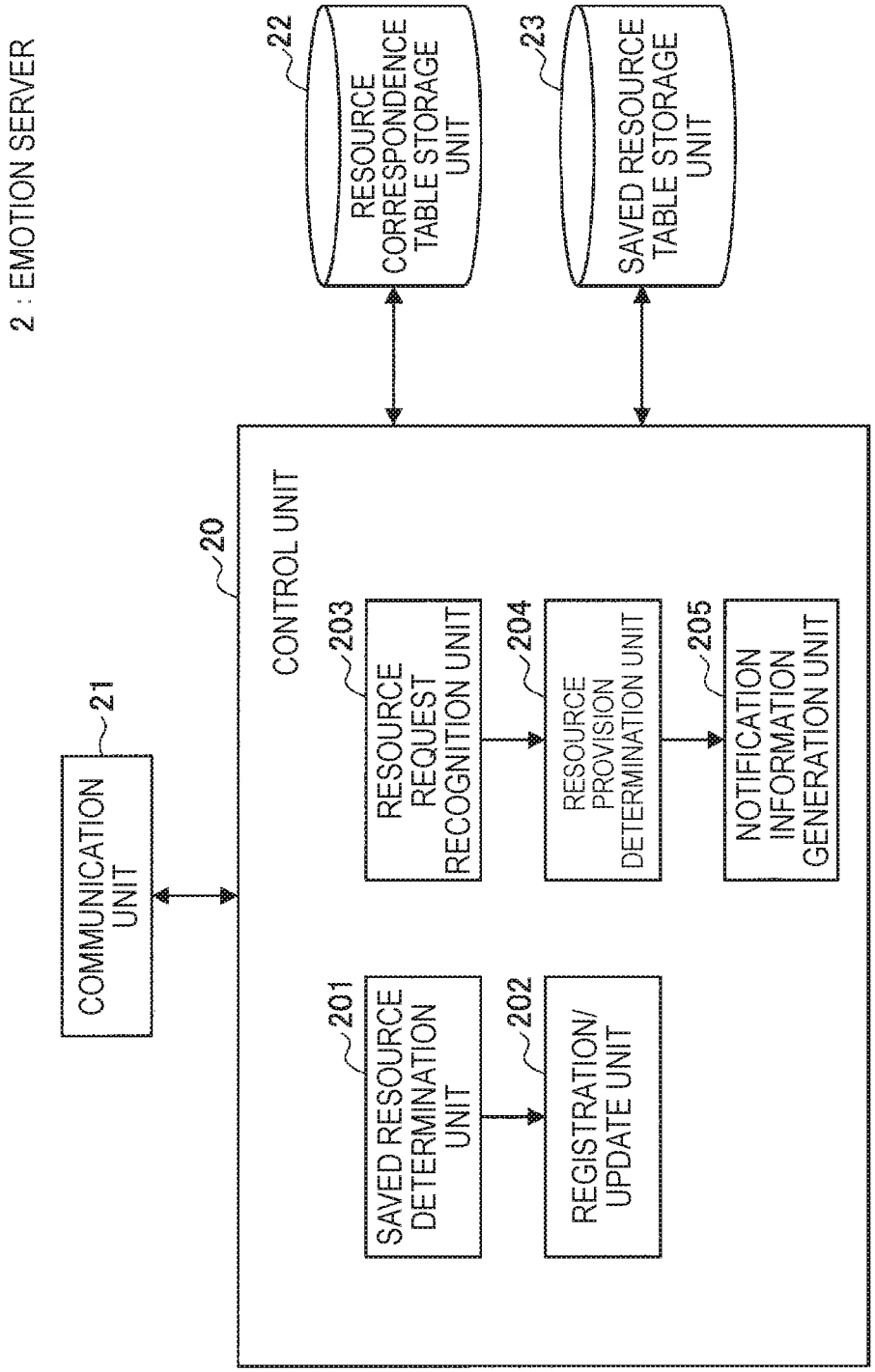
FIG. 4 is a block diagram illustrating an example of a configuration of an emotion server according to the present embodiment.

FIG. 4 illustrates an example of a configuration of the emotion server 2 according to the present embodiment. As illustrated in FIG. 4, the emotion server 2 includes a control unit 20, a communication unit 21, a resource correspondence table storage unit 22, and a saved resource table storage unit 23.

The control unit 20 functions as an arithmetic processing device and a control device, and controls the overall operation of the emotion server 2 in accordance with a variety of programs. The control unit 20 is implemented, for example, by an electronic circuit such as a CPU and a microprocessor. In addition, the control unit 20 may include a ROM that stores a program, an operation parameter and the like to be used, and a RAM that temporarily stores a parameter and the like varying as appropriate.

In addition, the control unit 20 according to the present embodiment also functions as a saved resource determination unit 201, a registration/update unit 202, a resource request recognition unit 203, a resource provision determination unit 204, and a notification information generation unit 205.

On the basis of an action recognition result transmitted from the sensor device 1, the saved resource determination unit 201 determines resources indirectly saved by the user, with reference to a resource correspondence table stored in the resource correspondence table storage unit 22. In the resource correspondence table, actions and related resources are associated. Details of the resource correspondence table will be described later using Table 1 below; for example, "electricity" is associated with an action of ascending/descending stairs without using an elevator, as related resources.

In addition, in the case where there are indirectly saved resources, the saved resource determination unit 201 calculates a resource saving amount in accordance with a saving evaluation rule registered in the resource correspondence table. The resource saving amount is, for example, added by a point system. For example, in the case where electric resources are saved by stair ascent/decent, the saved resource determination unit 201 works out a saving amount of 1 pt for a stair ascent/decent of one story.

On the basis of the user's saving amount calculated by the saved resource determination unit 201, the registration/update unit 202 registers or updates the user's saved resource table stored in the saved resource table storage unit 23. An example of the saved resource table will be described later with reference to Table 2 below.

On the basis of an action and feeling recognition result transmitted from the sensor device 1, the resource request recognition unit 203 refers to the resource correspondence table stored in the resource correspondence table storage unit 22, and estimates (recognizes) what resources the user is requesting (what resources the user is in trouble with).

The resource provision determination unit 204 determines whether or not resources needed by the user recognized by the resource request recognition unit 203 can be provided to the user, with reference to the user's saved resource table stored in the saved resource table storage unit 23. For example, in the case where the saving amount (point) of resources desired by the user is equal to or greater than a predetermined threshold (satisfies a permission level), the resource provision determination unit 204 determines that the resources can be preferentially provided to the user.

In the case where the resource provision determination unit 204 determines that resources can be provided to the user, the notification information generation unit 205 generates information (specification of the user, a place of the user, permitted resources, etc.) for notifying the user (specifically, the information processing terminal 4) or the corresponding resource management service server 5 (i.e., various resource management systems) that resources can be provided to the user.

The communication unit 21 connects to the network 3 in a wired or wireless manner, and transmits and receives data to and from the sensor device 1, the information processing terminal 4, and the resource management service server 5. For example, the communication unit 21 connects by communication to the network 3 by a wired/wireless local area network (LAN), Wi-Fi (registered trademark), or the like. The communication unit 21 according to the present embodiment receives information (sensor data and an action/feeling recognition result) obtained by sensing the user's action and feeling from the sensor device 1. In addition, the communication unit 21 transmits a notification indicating that resource provision (preferential use) is permitted to the information processing terminal 4 and the resource management service server 5.

The resource correspondence table storage unit 22 is a storage unit that stores a resource correspondence table. In the saving correspondence table, indirectly saved resources, a saving evaluation rule, and resources needed by the user are associated with the user's action or feeling. Here, Table 1 below shows an example of a saving correspondence table according to the present embodiment.

TABLE 1

| Action or feeling | Related resources | Saving evaluation |
|---|---|---|
| car ridesharing | road | 5 pt/time |
| ascending/descending stairs | electricity | 1 pt/story |
| place different from usual activity area feeling: in trouble remaining battery of smartphone or PC is 20% or less | electricity | — |
| using parking lot far from station | parking lot | 1 pt/time |
| purchasing content using kiosk terminal | bandwidth | 1 pt/time |

As illustrated in the first item of Table 1 above, the action of "car ridesharing" indirectly serves as saving of "road resources", because a plurality of people sharing one car reduces the number of cars used and relieves the congestion state of a road. As a saving evaluation rule, for example, 5 pt may be worked out for one ridesharing act. The saving evaluation rule is not limited to this; for example, points may be calculated in consideration of the number of people who share the car, ridesharing time, a distance, etc. as well as the number of times.

In addition, as illustrated in the second item of Table 1 above, an action of ascending/descending stairs without using an elevator for health (using stairs in a place with an elevator) serves as saving of "electric resources", because power of the elevator is not used. As a saving evaluation rule, for example, 1 pt may be worked out for stair ascent/decent of one story, or points may be calculated by further considering a distance (meter) and the number of steps of the stairs, and calories used by exercise.

In addition, as illustrated in the third item of Table 1 above, for example, in the case where a state such as "place different from usual activity area", "feeling in trouble", and "remaining battery of smartphone or PC is 20% or less" is recognized as a situation of user action and feeling, "electric resources" are related as resources needed by the user. Note that the user action and feeling here are examples, and the present embodiment is not limited to this.

In Table 1 described above, saved resources corresponding to a user action, and requested resources corresponding to a user state or situation are described together in the same data structure as a "resource correspondence table", but the present embodiment is not limited to this; the resources may be managed in different data structures.

The saved resource table storage unit 23 is a storage unit that stores a saved resource table. The saved resource table is generated for each user, and a saving amount of each resource up to the present time is registered. In addition, in the saved resource table, a "priority permission level" in use of each resource is associated. The "priority permission level" is used as a threshold when the resource provision determination unit 204 determines whether or not resource can be provided to the user. Here, Table 2 below shows an example of a saved resource table according to the present embodiment.

TABLE 2

| Resources | Saving amount | Priority permission level |
|---|---|---|
| road | 10 pt | 50 pt |
| electricity | 53 pt | 50 pt |
| parking lot | 25 pt | 120 pt |
| bandwidth | 6 pt | 5 pt |

As illustrated in the first item of Table 2 above, in regard to "road resources" for example, the user has already saved "10 pt", whereas the priority permission level is "50 pt"; hence, it is found that the priority permission level has not yet been reached. In addition, as illustrated in second item of Table 2 above, in regard to "electric resources" for example, the user has already saved "53 pt", whereas the priority permission level is "50 pt"; hence, it is found that the priority permission level has been reached. Therefore, when the user needs electric resources, the resource provision determination unit 204 determines that electric resources can be preferentially provided.

Note that in the case where resources are provided to the user, points of the saving amount may be reset. In this case, the points may be returned to 0, or points corresponding to the priority permission level may be subtracted. In addition, the reset method may be changed depending on users or resources.

A storage unit (not illustrated) included in the resource correspondence table storage unit 22 and the saved resource table storage unit 23 described above is implemented by a read only memory (ROM) and a random access memory (RAM); the ROM stores programs, operation parameters, or the like used in processing by the control unit 20, and the RAM temporarily stores parameters that change as appropriate or the like. In addition, the storage unit includes a storage device including a storage medium, a recording device for recording data on the storage medium, a reader device for reading out data from the storage medium, a deletion device for deleting data recorded on the storage medium, and the like.

The configuration of the emotion server 2 according to the present embodiment has been specifically described above. Note that the configuration of the emotion server 2 is not limited to the example illustrated in FIG. 4. For example, the control unit 20 of the emotion server 2 may further function as an action/feeling recognition unit.

3. Operation Processing

Next, operation processing of the information processing system according to the present embodiment will be described using FIG. 5 and FIG. 6.

3-1. Registration Processing

Figure 5:
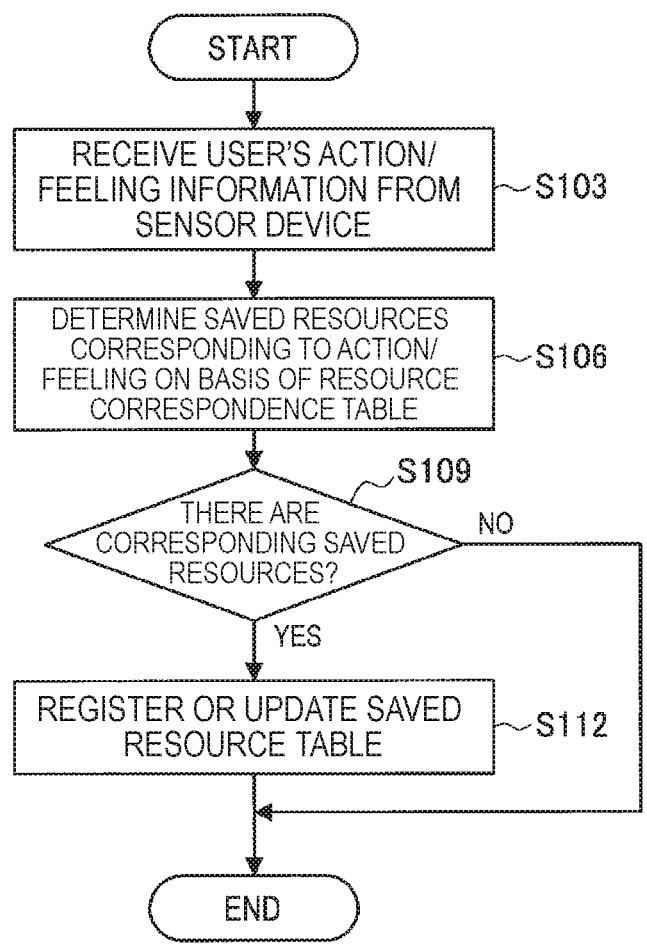
FIG. 5 is a flowchart illustrating saving act registration processing according to the present embodiment.

FIG. 5 is a flowchart illustrating saving act registration processing according to the present embodiment. As illustrated in FIG. 5, first, the emotion server 2 receives the user's action/feeling information (specifically, for example, an action/feeling recognition result) from the sensor device 1 (step S103). The user's day-to-day actions and feelings are continuously recognized by the sensor device 1, and transmitted to the emotion server 2.

Next, the saved resource determination unit 201 of the emotion server 2 determines saved resources corresponding to the action/feeling on the basis of the resource correspondence table (see Table 1) (step S106). In the case where there are saved resources, a saving amount (point) thereof is also calculated.

Then, in the case where there are corresponding saved resources (step S109/Yes), the registration/update unit 202 registers the user's saving amount of saved resources determined by the saved resource determination unit 201 in the user's saved resource table, or adds the saving amount to already accumulated saving amounts to update the saved resource table (step S112).

On the other hand, in the case where there are no corresponding saved resources (step S109/No), registration/update processing is not performed.

The registration processing described above can be performed on a daily basis.

3-2. Use Notification Processing

Figure 6:
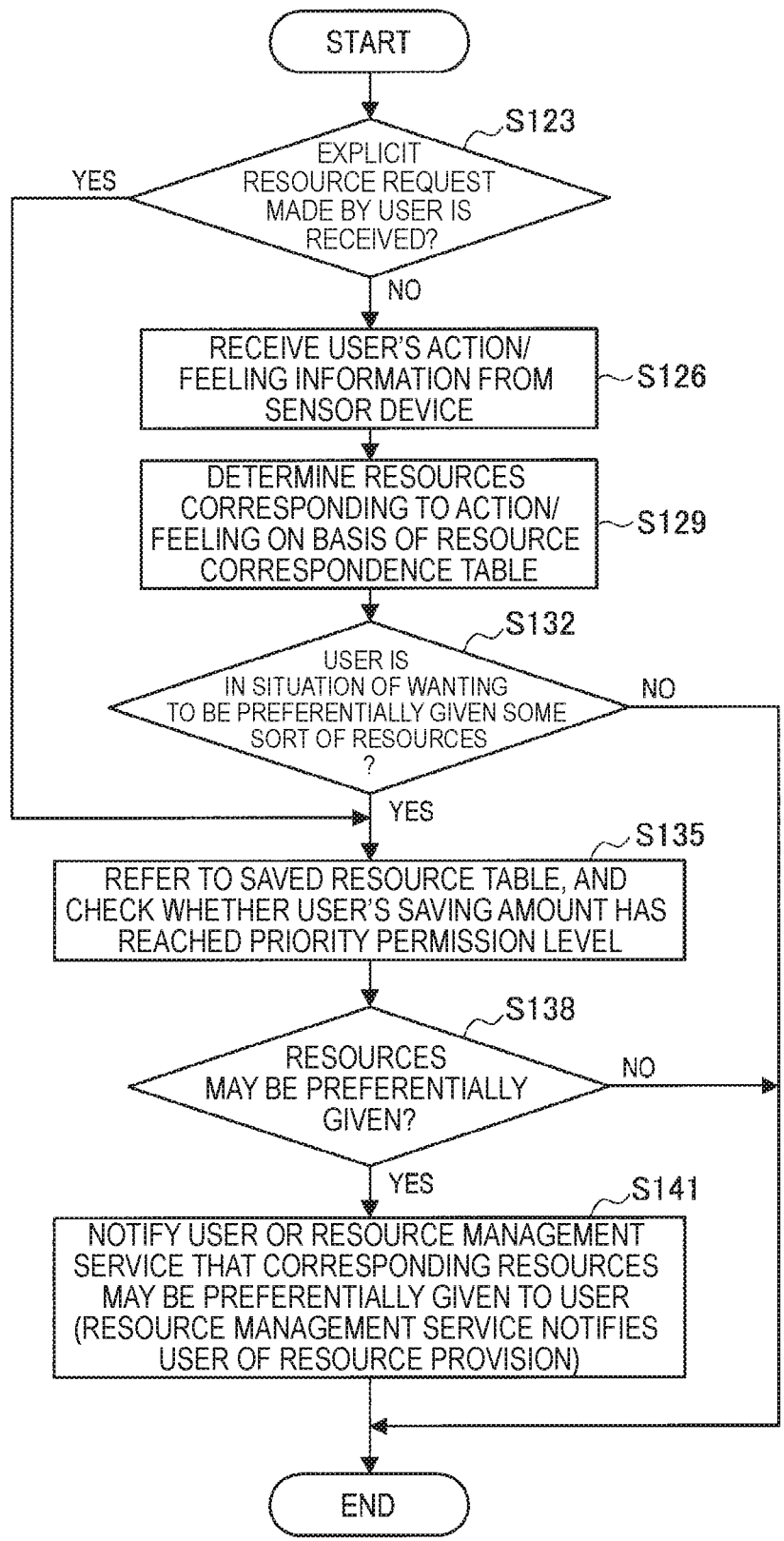
FIG. 6 is a flowchart illustrating resource use notification processing according to the present embodiment.

FIG. 6 is a flowchart illustrating resource use notification processing according to the present embodiment. As illustrated in FIG. 6, first, the emotion server 2 determines whether or not an explicit resource request made by the user is received (step S123). This is because, regardless of sensing of action/feeling by the sensor device 1, reception of an explicit request for specific resources ("I want to be provided with electric resources" etc.) from the user through a smartphone or the like is also assumed.

Next, in the case where an explicit use request is not received (step S123/No), when the emotion server 2 receives the user's action/feeling information from the sensor device 1 (step S126), the resource request recognition unit 203 determines resources corresponding to the action/feeling on the basis of the resource correspondence table (step S129). That is, the resource request recognition unit 203 determines whether or not the user is in trouble and needing some sort of resources (a situation of wanting to be given resources preferentially), on the basis of a recognition result of the user's actions and feelings.

Then, in the case where it is determined that the user is in a situation of wanting to be preferentially given some sort of resources (step S132/Yes), or in the case where an explicit resource request is made by the user (step S123/Yes), the resource provision determination unit 204 refers to the saved resource table, and checks whether the user's saving amount has reached the priority permission level (step S135).

Next, in the case where it can be determined that the user's saving amount has reached the priority permission level and resources may be preferentially given (step S138/Yes), the emotion server 2 notifies the user or resource management service that corresponding resources may be preferentially given to the user (step S141). The resource management service that receives the notification determines the user's preferential resource use (a use place, a use method, limitations on use, etc.), and notifies the user as appropriate.

On the other hand, in the case where the user's action/feeling information does not indicate a situation of wanting resources (step S132/No), or in the case where it is not determined that resources may be preferentially given (step S138/No), resource provision notification is not performed.

The use notification processing described above can be performed on a daily basis.

4. Examples

The basic registration processing and use notification processing according to the present embodiment have been described above. Next, registration processing and use notification processing according to the present embodiment will be described more specifically using a plurality of examples.

4-1. First Example

First, as a first example, a car ridesharing action, and use of road resources indirectly saved by the action are described with reference to FIG. 7 and FIG. 8.

4-1-1. Sensing of Ridesharing Action

Figure 7:
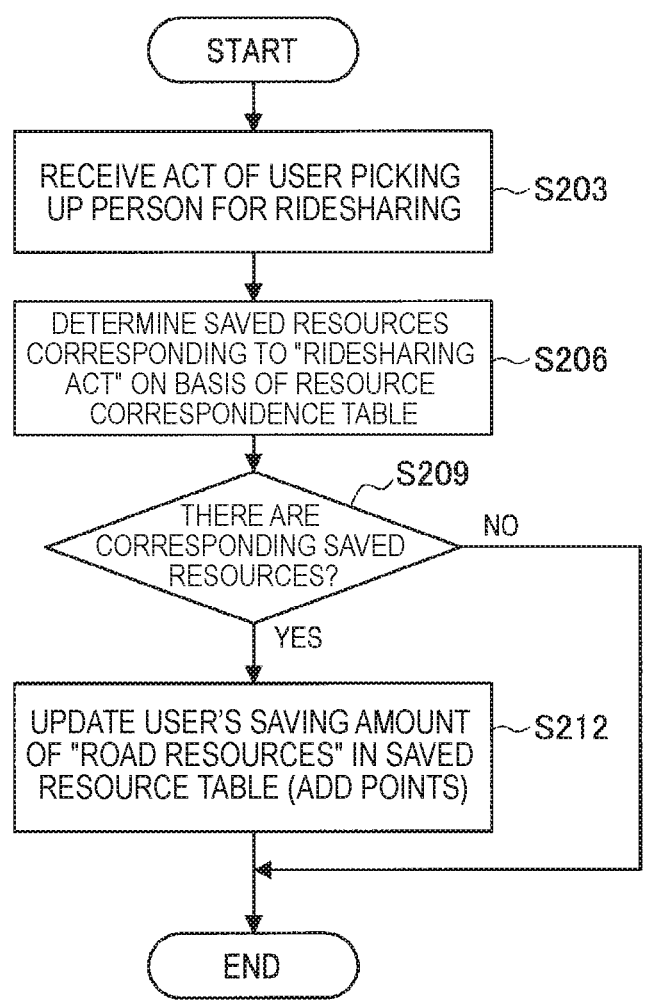
FIG. 7 is a flowchart illustrating registration processing in the case where an indirect saving act is ridesharing according to a first example.

FIG. 7 is a flowchart illustrating registration processing in the case where an indirect saving act is ridesharing according to the first example. In car ridesharing, a plurality of people riding in one car has an effect of relieving congestion, and serves as saving of road resources. In the United States for example, to relieve congestion, there is a road called "car pool lane" that can be traveled only with a plurality of occupants.

As a ridesharing method, for example, a ridesharing matching service system is used, and a user who rides in a car in rush hours of weekdays, or the like is assumed to search for a person heading to the same direction with a smartphone or the like, and pick up the person on his/her way. A user who desires ridesharing inputs an intended direction, a destination, and current position information from a smartphone or the like, and waits. A case where the waiting user does not use his/her own car because of being intended to save road resources (e.g., relieve congestion) is also assumed; such a direct resource saving act may also be a target of evaluation in the present embodiment. In addition, a user who permits ridesharing mainly has kindness and an intention to help people, but an act of allowing ridesharing indirectly serves as saving of road resources.

As illustrated in FIG. 7, first, when a ridesharing act as described above (an act of the user picking up a person for ridesharing) is received from the sensor device 1 (step S203), the emotion server 2 determines saved resources corresponding to a "ridesharing act" on the basis of the resource correspondence table (step S206). The ridesharing act can be detected by, for example, a smartphone or the like using a ridesharing matching service system, or various sensor devices 1 such as a camera or a microphone provided in car.

Next, in the case where there are corresponding saved resources (step S209/Yes) (here, "road resources" correspond as shown in Table 1), the registration/update unit 202 adds a saving amount of "road resources", which are the user's saved resources determined by the saved resource determination unit 201 (here, the saving amount is 5 pt for one ridesharing on the basis of the resource correspondence table in Table 1), to the saving amount of "road resources" of the user's saved resource table, and updates the table (step S212).

In this manner, ridesharing acts of a user picking up others in a car from kindness and a will to help people in daily life are evaluated as indirect road resource saving acts, and the user's road resource saving amounts are accumulated.

4-1-2. Use of Road Resources

Next, a case where a user who has been performing ridesharing acts described above is put in a situation of needing to use road resources is described with reference to FIG. 8. FIG. 8 is a flowchart illustrating road resource preferential use notification processing according to the first example.

Figure 8:
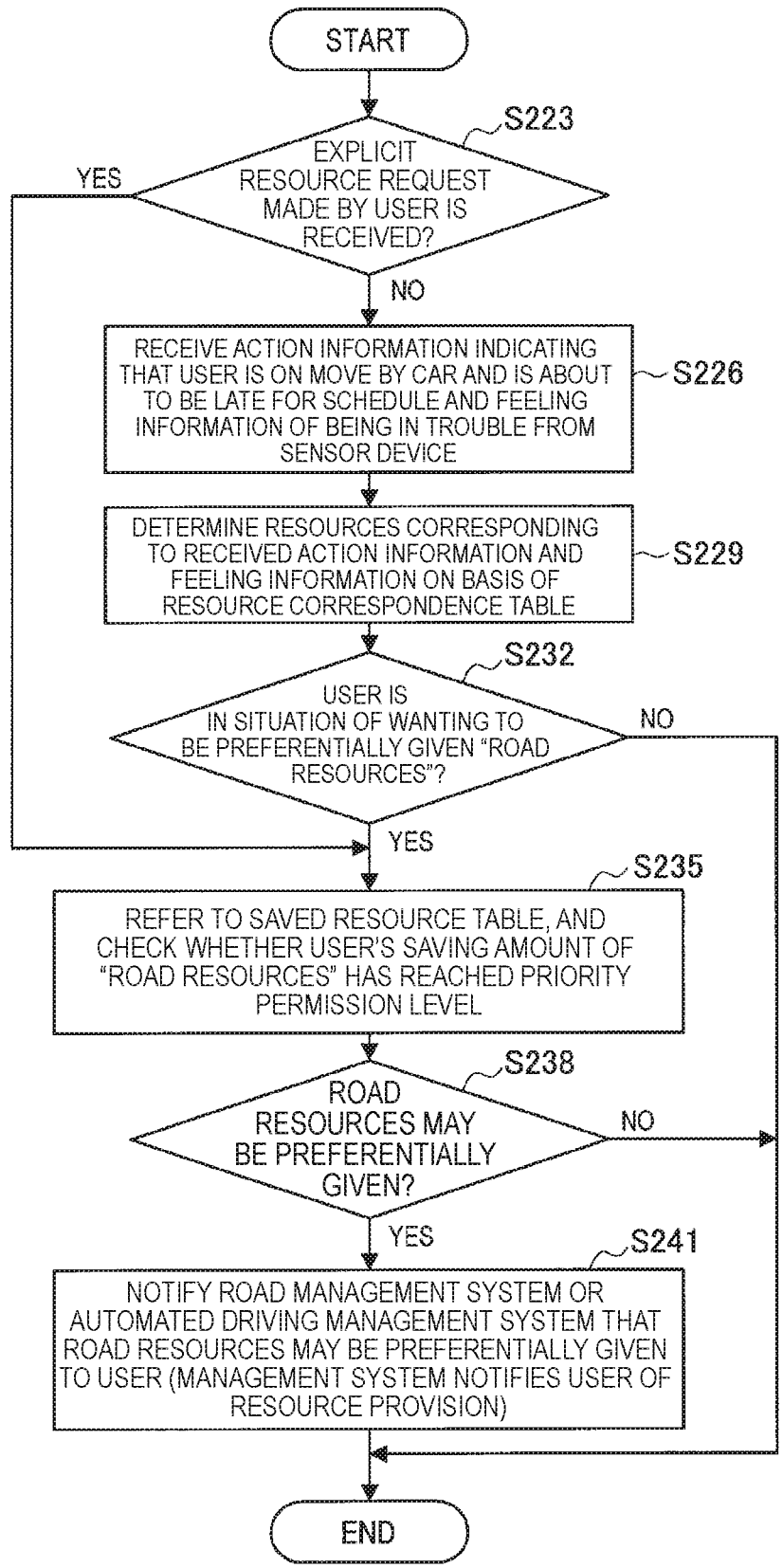
FIG. 8 is a flowchart illustrating road resource preferential use notification processing according to the first example.

As illustrated in FIG. 8, first, the emotion server 2 determines whether or not an explicit use request for road resources made by the user is received (step S223).

Next, in the case where an explicit use request is not received (step S223/No), when the emotion server 2 receives predetermined action information and feeling information from the sensor device 1 (step S226), the resource request recognition unit 203 determines resources corresponding to the action/feeling on the basis of the resource correspondence table (step S229).

Here, for example, action information indicating that the user is on a move by car and is about to be late for a schedule (a desired arrival time at the destination is imminent) and feeling information of being in trouble are received from the sensor device 1. The action information of being about to be late for a schedule can be recognized from, for example, the user's schedule information (date and time, and place), a destination and a desired arrival time that are registered in a car navigation application activated in a car, a smartphone, etc., the user's current position information, or the like. In addition, the feeling information of being in trouble can be recognized from, for example, the user's facial expressions, murmur, heart rate, perspiration, or the like.

Then, in the case where it is determined that the user is in a situation of wanting to be preferentially given road resources (step S232/Yes), or in the case where an explicit road resource request is made by the user (step S223/Yes), the resource provision determination unit 204 refers to the saved resource table, and checks whether the user's saving amount of road resources has reached the priority permission level (step S235).

Next, in the case where it can be determined that the user's saving amount of road resources has reached the priority permission level and road resources may be preferentially given (step S238/Yes), the emotion server 2 notifies a road management system or an automated driving management system that road resources may be preferentially given to the user (step S241). Specifically, for example, the emotion server 2 notifies the management system to shorten traffic light waiting time on the user's traveling route, or cause a predetermined dedicated line on the traveling route to be preferentially used.

The management system that receives the notification communicates with a car navigation system, notifies the user who is driving that road resources can be preferentially used, or guides the user that traffic light waiting time will thus be shortened and the use of a predetermined dedicated lane. In addition, in the case of an automated driving system, to allow the user's car to preferentially use a road, traveling of other cars may be controlled (e.g., to make way). Note that when the user preferentially uses road resources, the emotion server 2 resets the user's road resource saving amount.

On the other hand, in the case where the user's action/feeling information does not indicate a situation of wanting road resources (step S232/No), or in the case where it is not determined that road resources may be preferentially given (step S238/No), resource provision notification is not performed.

In this manner, ridesharing acts that a user usually performs are evaluated as indirect road resource saving acts, and road resource saving amounts are accumulated; thus, when the user is in trouble with use of a road, road resources can be preferentially used.

4-2. Second Example

Next, as a second example, an action of ascending/descending stairs for health in a place with an elevator, and use of electric resources indirectly saved by the action are described with reference to FIG. 9 and FIG. 10.

4-2-1. Sensing of Stair Ascent/Decent Action

Figure 9:
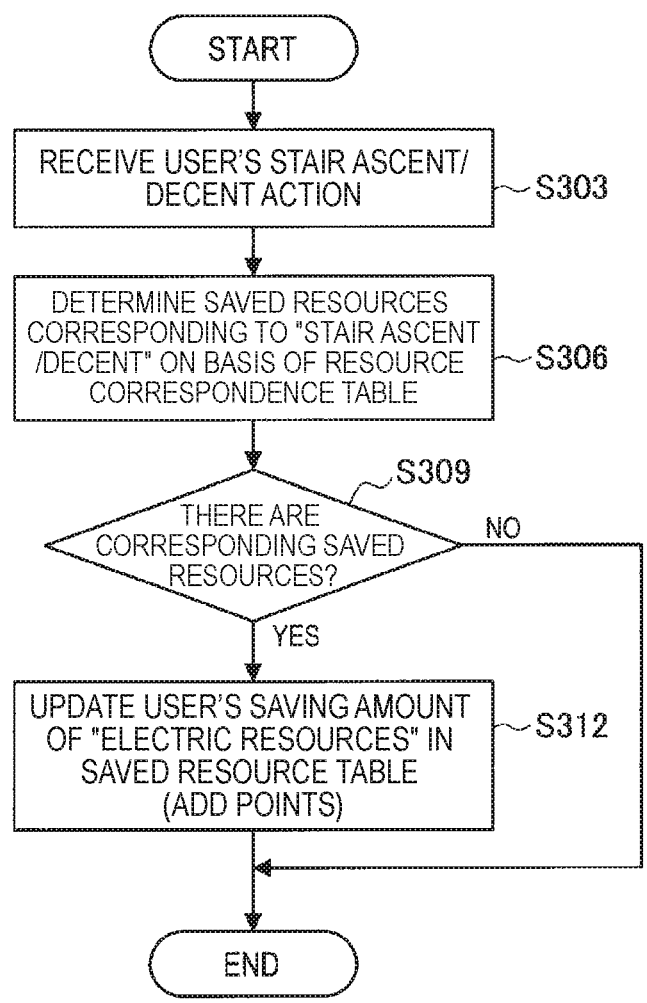
FIG. 9 is a flowchart illustrating registration processing in the case where an indirect saving act is stair ascent/decent according to a second example.

FIG. 9 is a flowchart illustrating registration processing in the case where an indirect saving act is stair ascent/decent according to the second example. An act of ascending/descending stairs in a place with an elevator serves as saving of electric resources because the elevator is not used, even if the user's intention is to be healthy.

As illustrated in FIG. 9, first, when a stair ascent/decent act in a place with an elevator is received from the sensor device 1 (step S303), the emotion server 2 determines saved resources corresponding to the "stair ascent/decent act" on the basis of the resource correspondence table (step S306). The stair ascent/descent act can be detected by, for example, various sensor devices 1 such as a smartphone or a wearable device owned by the user.

Next, in the case where there are corresponding saved resources (step S309/Yes) (here, "electric resources" correspond as shown in Table 1), the registration/update unit 202 adds a saving amount of "electric resources", which are the user's saved resources determined by the saved resource determination unit 201 (here, the saving amount is 1 pt for ascent/descent of one story on the basis of the resource correspondence table in Table 1. Therefore, in the case of descending stairs from 3rd floor to 1st floor, for example, the saving amount is 2 pt.) to the saving amount of "electric resources" of the user's saved resource table, and updates the table (step S312).

In this manner, acts of a user using stairs for health in daily life are evaluated as indirect electric resource saving acts, and the user's electric resource saving amounts are accumulated.

4-2-2. Use of Electric Resources

Next, a case where a user who has been performing stair ascent/decent acts described above is put in a situation of needing to use electric resources is described with reference to FIG. 10. FIG. 10 is a flowchart illustrating electric resource preferential use notification processing according to the second example.

Figure 10:
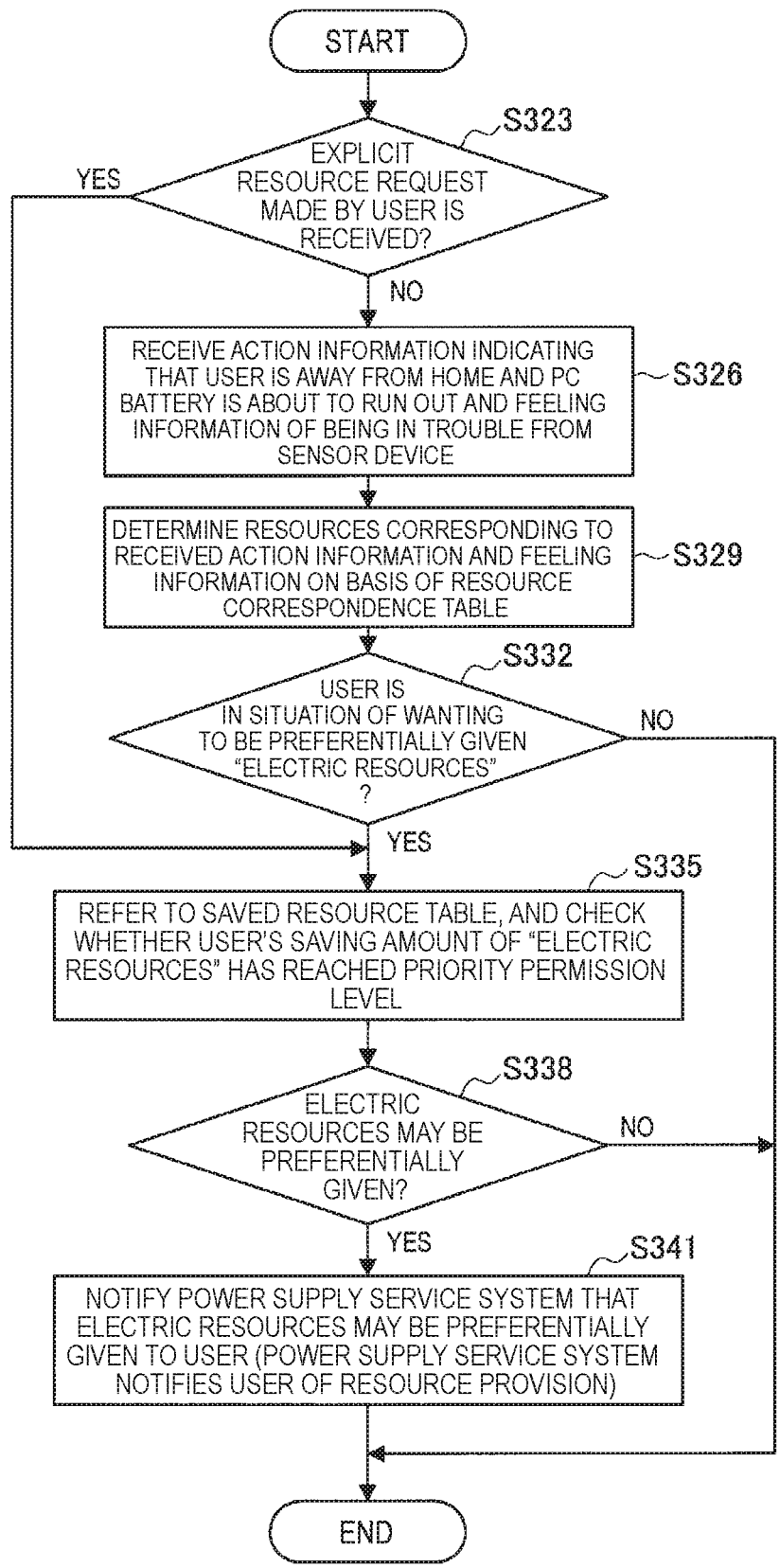
FIG. 10 is a flowchart illustrating electric resource preferential use notification processing according to the second example.

As illustrated in FIG. 10, first, the emotion server 2 determines whether or not an explicit use request for electric resources made by the user is received (step S323).

Next, in the case where an explicit use request is not received (step S323/No), when the emotion server 2 receives predetermined action information and feeling information from the sensor device 1 (step S326), the resource request recognition unit 203 determines resources corresponding to the action/feeling on the basis of the resource correspondence table (step S329).

Here, for example, action (situation, state) information indicating that the user is away from home (or in a place different from a usual activity area) and PC battery is about to run out and feeling information of being in trouble are received from the sensor device 1. A state where PC battery is about to run out may be recognized, for example, in the case where a predetermined threshold is exceeded, such as the PC's remaining battery being 20% or less. The PC's battery situation can be recognized by a smartphone (the sensor device 1) that connects by communication to the PC. In addition, the sensor device 1 can recognize, by a position measurement unit, that the user is currently away from home (or in a place different from a usual activity area). In addition, the feeling information of being in trouble can be recognized from, for example, the user's facial expressions (imaged by a camera of the sensor device 1 worn by the user, such as smart eyeglasses), murmur (collected by a microphone of the sensor device 1), heart rate, perspiration, or the like (detected by a biosensor of the sensor device 1 worn by the user, such as a smart band).

Then, in the case where it is determined that the user is in a situation of wanting to be preferentially given electric resources (step S332/Yes), or in the case where an explicit electric resource request is made by the user (step S323/Yes), the resource provision determination unit 204 refers to the saved resource table, and checks whether the user's saving amount of electric resources has reached the priority permission level (step S335).

Next, in the case where it can be determined that the user's saving amount of electric resources has reached the priority permission level and electric resources may be preferentially given (step S338/Yes), the emotion server 2 notifies a power supply service system or the like that electric resources may be preferentially given to the user (step S341).

The power supply service system that receives a notification permitting preferential use of electric resources from the emotion server 2 can provide electricity to the target user by various methods. For example, the power supply service system may notify the user's PC or smartphone of the place of a special-use receptacle in the vicinity of the user (a charging café having an AC receptacle that can be used for free for a limited time, or the like). In addition, the emotion server 2 may transmit a notification permitting power supply to the user to a drone that can use mobile battery, and cause the drone to fly to a place where the user is. In addition, in either case, personal authentication may be performed in the case where the user actually uses electricity. The personal authentication may be, for example, facial recognition, fingerprint authentication, or other biometric authentication, or may be authentication based on radio frequency communication, near field communication, or an operation with the user's smartphone or wearable device.

On the other hand, in the case where the user's action/feeling information does not indicate a situation of wanting electric resources (step S332/No), or in the case where it is not determined that electric resources may be preferentially given (step S338/No), resource provision notification is not performed.

In this manner, stair ascent/descent acts that a user usually performs for health are evaluated as indirect electric resource saving acts, and electric resource saving amounts are accumulated; thus, when the user is in trouble with use of electricity, electric resources can be preferentially used.

4-3. Third Example

Next, as a third example, an action of parking at a parking lot far from a destination such as a station and walking to the destination for health, and use of parking lot resources indirectly saved by the action are described with reference to FIG. 11 and FIG. 12. In the case where the user uses a remote parking lot for health, a congestion situation of a parking lot near the destination is relieved, and parking lot resources can be saved.

4-3-1. Sensing of Remote Parking Lot Use Action

Figure 11:
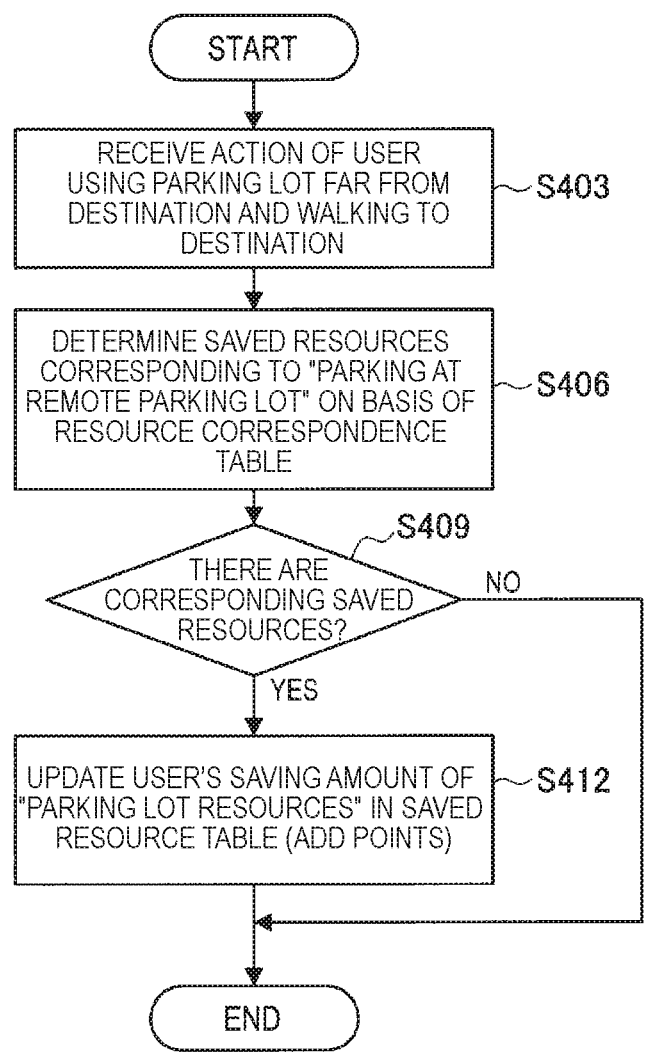
FIG. 11 is a flowchart illustrating registration processing in the case where an indirect saving act is use of a remote parking lot according to a third example.

FIG. 11 is a flowchart illustrating registration processing in the case where an indirect saving act is use of a remote parking lot according to the third example.

As illustrated in FIG. 11, first, when action information indicating that the user uses a parking lot far from a destination and walks to the destination is received from the sensor device 1 (step S403), the emotion server 2 determines saved resources corresponding to the "parking at remote parking lot" on the basis of the resource correspondence table (step S406). The act of parking at a remote parking lot can be recognized by the sensor device 1 such as a smartphone on the basis of, for example, information of the destination and the actual parking place input to a navigation system of the car, and the user's subsequent motion (walking to the destination).

Next, in the case where there are corresponding saved resources (step S409/Yes) (here, "parking lot resources" correspond as shown in Table 1), the registration/update unit 202 adds a saving amount of "parking lot resources", which are the user's saved resources determined by the saved resource determination unit 201 (here, the saving amount is 1 pt for one parking on the basis of the resource correspondence table in Table 1), to the saving amount of "parking lot resources" of the user's saved resource table, and updates the table (step S412). Note that a saving evaluation rule is not limited to the example illustrated in Table 1; for example, points of the saving amount may be calculated in consideration of the destination, such as a station, a degree of demand of a vacant parking lot in its vicinity, and a degree of demand of the remote parking lot used by the user (parking lots nearer to the station are assumed to be of higher demand). In addition, an act of parking in a remote place even though there is vacant space in a parking lot near the destination such as a station may be further evaluated.

In this manner, acts of a user parking at a parking lot far from a destination and walking to the destination for health in daily life are evaluated as indirect parking lot resource saving acts, and the user's parking lot resource saving amounts are accumulated.

4-3-2. Use of Parking Lot Resources

Next, a case where a user who has been performing remote parking lot use acts described above is put in a situation of needing to use parking lot resources is described with reference to FIG. 12. FIG. 12 is a flowchart illustrating parking lot resource preferential use notification processing according to the third example.

Figure 12:
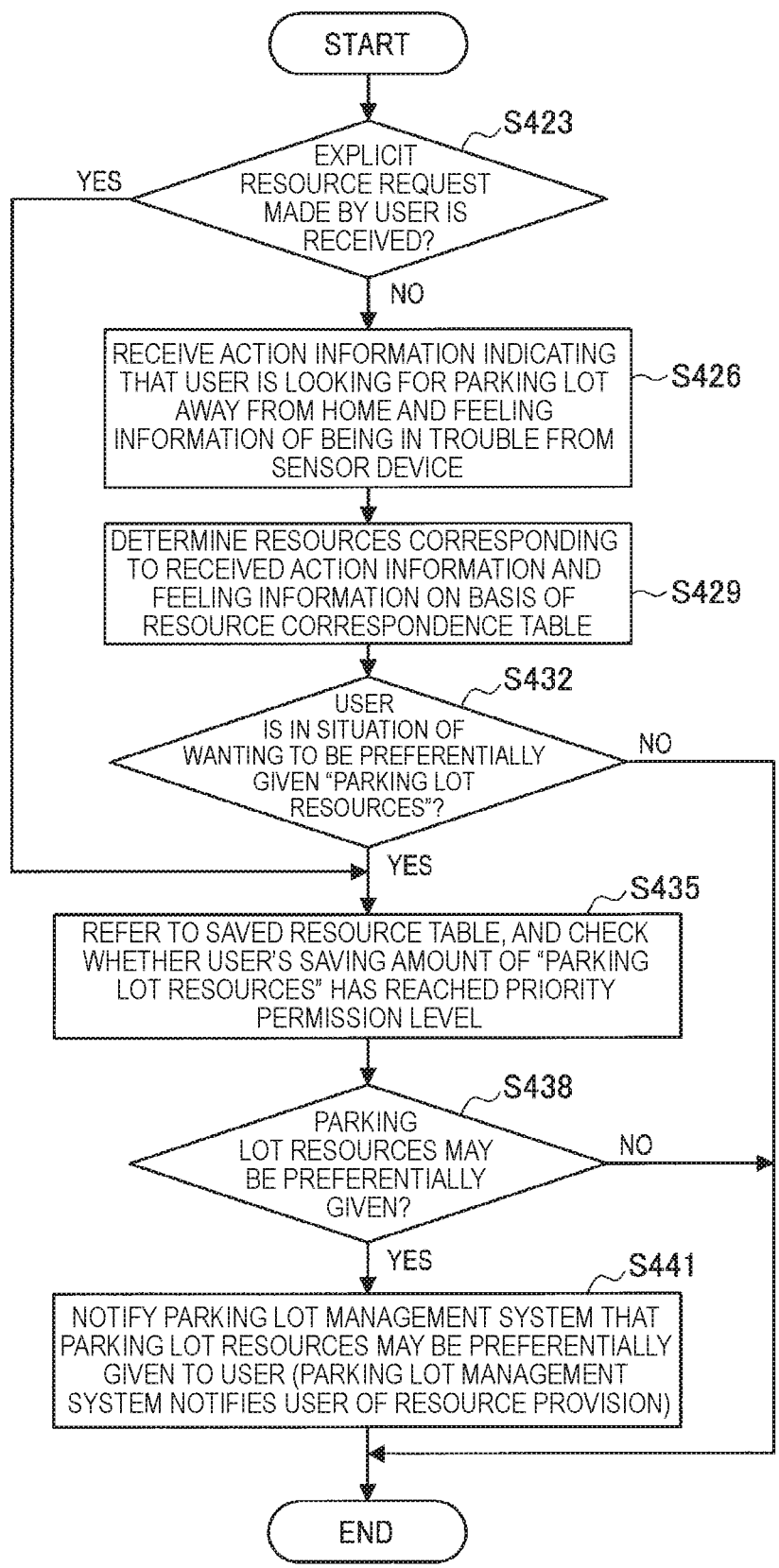
FIG. 12 is a flowchart illustrating parking lot resource preferential use notification processing according to the third example.

As illustrated in FIG. 12, first, the emotion server 2 determines whether or not an explicit use request for parking lot resources made by the user is received (step S423).

Next, in the case where an explicit use request is not received (step S423/No), when the emotion server 2 receives predetermined action information and feeling information from the sensor device 1 (step S426), the resource request recognition unit 203 determines resources corresponding to the action/feeling on the basis of the resource correspondence table (step S429).

Here, for example, action (situation) information indicating that the user is looking for a parking lot (urgently needs parking space) away from home and feeling information of being in trouble are received from the sensor device 1. The action information of looking for a parking lot is recognized on the basis of a situation such as the user wandering without parking around a destination input to a navigation system of the car or not being able to park around the destination even though a meeting time is approaching according to schedule information, by the sensor device 1 such as a smartphone that connects by communication to the navigation system and includes a position measurement unit. In addition, the feeling information of being in trouble can be recognized from, for example, the user's facial expressions, murmur, heart rate, perspiration, or the like.

Then, in the case where it is determined that the user is in a situation of wanting to be preferentially given parking lot resources (step S432/Yes), or in the case where an explicit parking lot resource request is made by the user (step S423/Yes), the resource provision determination unit 204 refers to the saved resource table, and checks whether the user's saving amount of parking lot resources has reached the priority permission level (step S435).

Next, in the case where it can be determined that the user's saving amount of parking lot resources has reached the priority permission level and parking lot resources may be preferentially given (step S438/Yes), the emotion server 2 notifies the user or a parking lot management system that parking lot resources may be preferentially given to the user (step S441).

The parking lot management system that receives the notification, for example, notifies the user's smartphone or a car navigation system of vacant parking space in the vicinity of the user, and guides the user. In addition, the parking lot management system may notify the user that preferential use of usually reserved special parking space in the vicinity of the user is permitted, and guide the user. In addition, when the user is lining up in a parking lot waiting line for parking, the parking lot management system may notify the user that preferential use of parking space is permitted, and guide the user to a priority lane. In addition, the emotion server 2 may transmit information guiding the user to vacant parking space in the vicinity of the user to the user's information processing terminal 4. Note that when the user preferentially uses parking lot resources, the emotion server 2 resets the user's parking lot resource saving amount.

On the other hand, in the case where the user's action/feeling information does not indicate a situation of wanting parking lot resources (step S432/No), or in the case where it is not determined that parking lot resources may be preferentially given (step S438/No), resource provision notification is not performed.

In this manner, acts of parking at a remote parking lot and walking to the destination that a user usually performs for health are evaluated as indirect parking lot resource saving acts, and parking lot resource saving amounts are accumulated; thus, when the user is in trouble with use of parking lots, parking lot resources can be preferentially used.

4-4. Fourth Example

Next, as a fourth example, an action of purchasing data such as software or content (music, a moving image, a game, etc.) using a kiosk terminal, and use of bandwidth resources indirectly saved by the action are described with reference to FIG. 13 and FIG. 14.

4-4-1. Sensing of Data Purchase Action Using Kiosk Terminal

Figure 13:
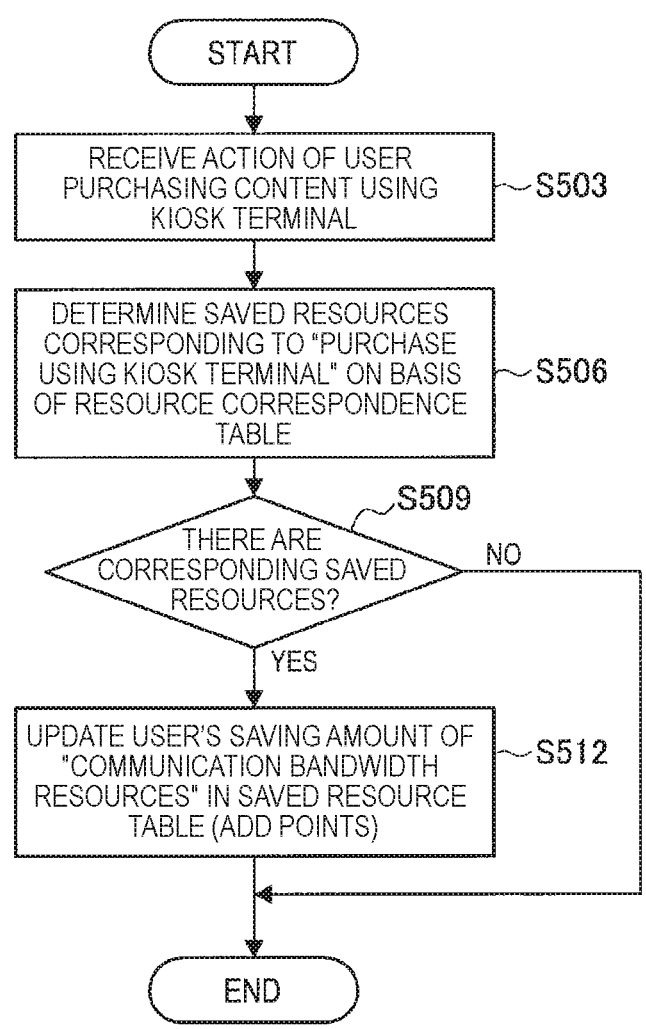
FIG. 13 is a flowchart illustrating registration processing in the case where an indirect saving act is data purchase using a kiosk terminal according to a fourth example.

FIG. 13 is a flowchart illustrating registration processing in the case where an indirect saving act is data purchase using a kiosk terminal according to the fourth example. Conventionally, software or content includes package editions (products supplied in the form of physically packed recording media) and download sales; in the present example, a case is assumed where a kiosk terminal that sells data such as software or content is installed in an event venue, a station where many people gather, or the like.

When stopping by a place where the kiosk terminal is installed, the user can directly connect (USB connection, a wired LAN, etc.) his/her own information processing terminal (smartphone, PC, game console, etc.), and install software or content. In this case, the user only has the feeling of having purchased a product at the given opportunity of searching for desired software or content, but the act indirectly serves as saving of bandwidths of third generation (3G), long term evolution (LTE), etc.

As illustrated in FIG. 13, first, when an act of installing data of software or content from a kiosk terminal to the user's smartphone or the like (a data purchase act in the kiosk terminal) is received from the sensor device 1 (step S503), the emotion server 2 determines saved resources corresponding to a "purchase using kiosk terminal" on the basis of the resource correspondence table (step S506). A data purchase act using a kiosk terminal can be detected by the sensor device 1 such as a smartphone connecting to the kiosk terminal by wired connection (USB, a wired LAN, etc.) or wireless connection (Wi-Fi (registered trademark), Bluetooth (registered trademark), near field communication, infrared communication, etc.).

Next, in the case where there are corresponding saved resources (step S509/Yes) (here, "bandwidth resources" correspond as shown in Table 1), the registration/update unit 202 adds a saving amount of "bandwidth resources", which are the user's saved resources determined by the saved resource determination unit 201 (here, the saving amount is 1 pt for one purchase on the basis of the resource correspondence table in Table 1), to the saving amount of "bandwidth resources" of the user's saved resource table, and updates the table (step S512). Note that a saving evaluation rule is not limited to the example illustrated in Table 1; for example, the saving amount may be calculated proportionately with data volume of the purchased software or content.

In this manner, a user purchasing software or content using a kiosk terminal in daily life is evaluated as indirect bandwidth resource saving acts, and the user's bandwidth resource saving amounts are accumulated.

4-4-2. Use of Bandwidth Resources

Next, a case where a user who has been performing purchase using a kiosk terminal described above is put in a situation of needing to use bandwidth resources is described with reference to FIG. 14. FIG. 14 is a flowchart illustrating bandwidth resource preferential use notification processing according to the fourth example.

Figure 14:
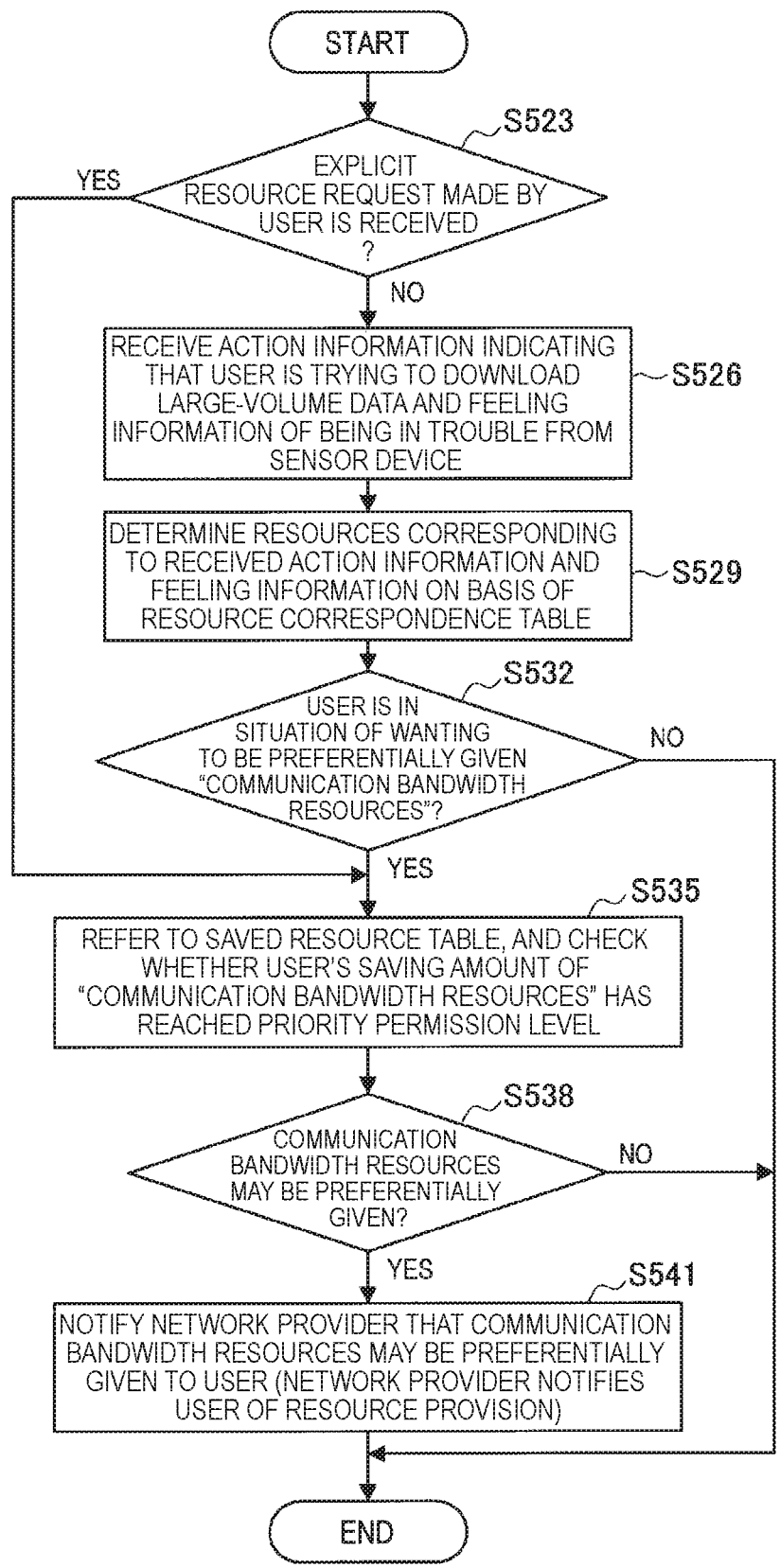
FIG. 14 is a flowchart illustrating bandwidth resource preferential use notification processing according to the fourth example.

As illustrated in FIG. 14, first, the emotion server 2 determines whether or not an explicit use request for bandwidth resources made by the user is received (step S523).

Next, in the case where an explicit use request is not received (step S523/No), when the emotion server 2 receives predetermined action information and feeling information from the sensor device 1 (step S526), the resource request recognition unit 203 determines resources corresponding to the action/feeling on the basis of the resource correspondence table (step S529).

Here, for example, action information indicating that the user is trying to download large-volume data and feeling information of being in trouble are received from the sensor device 1. The action information of trying to download large-volume data can be recognized on the basis of a communication situation of the user's information processing terminal (smartphone, PC, etc.). In addition, the feeling information of being in trouble can be recognized from, for example, the user's facial expressions, murmur, heart rate, perspiration, or the like.

Then, in the case where it is determined that the user is in a situation of wanting to be preferentially given bandwidth resources (step S532/Yes), or in the case where an explicit bandwidth resource request is made by the user (step S523/Yes), the resource provision determination unit 204 refers to the saved resource table, and checks whether the user's saving amount of bandwidth resources has reached the priority permission level (step S535).

Next, in the case where it can be determined that the user's saving amount of bandwidth resources has reached the priority permission level and bandwidth resources may be preferentially given (step S538/Yes), the emotion server 2 notifies a network provider (communication connection service provision system) that bandwidth resources may be preferentially given to the user (step S541).

The network provider that receives the notification relaxes limitations on bandwidths of a communication line used by the user's information processing terminal, preferentially allocates bandwidths to the user, and notifies the user of a bandwidth situation. In addition, the network provider may permit temporary access to public communication (e.g., public Wi-Fi) connection service of higher speed than current communication speed that normally cannot be used by the user, and preferentially allocate bandwidths to the user. Note that when the user preferentially uses bandwidth resources, the emotion server 2 resets the user's bandwidth resource saving amount.

On the other hand, in the case where the user's action/feeling information does not indicate a situation of wanting bandwidth resources (step S532/No), or in the case where it is not determined that bandwidth resources may be preferentially given (step S538/No), resource provision notification is not performed.

In this manner, purchase using a kiosk terminal that a user usually performs is evaluated as indirect bandwidth resource saving acts, and bandwidth resource saving amounts are accumulated; thus, when the user is in trouble with use of bandwidths, such as needing to download a file of large data volume away from home or the like, bandwidth resources can be preferentially used.

4-5. Others

Specific description has been given above using a plurality of examples. In addition, resources may also include plastic bottles, public seats, and the like.

For example, in the case where a user usually uses a water bottle, the use serves as indirect plastic bottle resource saving acts even if the user's intention is to save money. Use of the water bottle by the user may be detected by the water bottle being Internet of Things (IoT), or may be recognized from the user's action, writings in social networking service (SNS) such as a blog, or the like.

In this case, for example, when the user is thirsty and in trouble away from home, a notification permitting preferential use of plastic bottle resources is made from the emotion server 2 to a plastic bottle resource management system or the like, and the plastic bottle resource management system performs notification of preferential use of a vending machine, guiding to the place of the vending machine, drink sales by a drone (delivering drinks directly to a place where the user is), a discount on drinks in a vending machine etc., or the like; thus, the user can preferentially use plastic bottle resources.

In addition, for example, an act of a user walking to the next station for health serves as indirect saving of space, because the user does not ride on a train for the section and correspondingly space in the train becomes available (one seat becomes available). In addition, an increase in such saving acts makes the train uncrowded and comfortable; thus, air conditioning in the train can be weakened, and the act can also be associated with saving of electric resources. In addition, the act can also be associated with saving of related other resources.

In the case where the user is saving spatial resources from day to day, for example, when the user rides on a crowded train one day, a notification that preferential use of spatial resources is permitted is made from the emotion server 2 to a seat reservation system or the like, and the seat reservation system notifies the user that a special train car can be preferentially used, that a special seat can be used, etc.; thus, spatial resources can be preferentially used.

5. Conclusion

As described above, in the information processing system according to the embodiment of the present disclosure, it is possible to accumulate indirect resource saving acts, and preferentially provide resources to a user in accordance with accumulation of the acts.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, a computer program for causing hardware such as a CPU, ROM, and RAM built in the sensor device 1 or the emotion server 2 described above to exhibit functions of the sensor device 1 or the emotion server 2 can also be produced. Furthermore, a computer-readable storage medium in which the computer program is stored is also provided.

In addition, in the examples described above, in making notification of preferential use of resources, notification is made to predetermined resource management service and the resource management service notifies the user, but the present embodiment is not limited to this; like each predetermined resource management service, the notification information generation unit 205 of the emotion server 2 may generate information for notifying the user of preferential resource use and guiding the user, and transmit the information to the user.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
a communication unit configured to receive information obtained by sensing an action of a user; and
a control unit configured to
accumulate, in units of users, action information of indirectly saving resources in a predetermined storage unit on the basis of the information, and
perform control, when the user is estimated to desire resources, to generate a control signal for preferentially providing the resources to the user, and transmit the control signal via the communication unit, in accordance with the accumulated action information of the user.

(2)
The information processing device according to (1), in which
the communication unit receives information related to feeling of a user, and
the control unit estimates that the user desires resources further on the basis of the information related to the feeling of the user.

(3)
The information processing device according to (2), in which
when the user has a feeling of being in trouble, the control unit estimates resources desired by the user on the basis of resources related to action information of the user.

(4)
The information processing device according to any one of (1) to (3), in which
when the user is estimated to desire resources, the control unit transmits, to the user via the communication unit, notification information indicating that the resources are preferentially provided to the user in accordance with action information of indirect resource saving by the user accumulated in the storage unit.

(5)
The information processing device according to (4), in which
the control unit
converts the action information of the indirect resource saving into numerical values and accumulates the numerical values in the storage unit, and
in a case where a value of a saving action of the user corresponding to resources desired by the user satisfies a predetermined condition, transmits notification information indicating that the resources are preferentially provided.

(6)
The information processing device according to any one of (1) to (5), in which
when the user is estimated to desire preferential traveling of a predetermined road by a car, the control unit transmits a control signal to a road management system or an automated driving system via the communication unit so that the user can preferentially travel the road, in accordance with the accumulated action information of the user.

(7)
The information processing device according to (6), in which
the accumulated action information of the user is a car ridesharing act.

(8)
The information processing device according to any one of (1) to (5), in which
when the user is estimated to desire power supply to an information processing device owned by the user, the control unit generates a control signal for preferentially supplying power to the owned device, and transmits the control signal via the communication unit, in accordance with the accumulated action information of the user.

(9)
The information processing device according to (8), in which
the accumulated action information of the user is a stair ascent/descent act.

(10)
The information processing device according to (8) or (9), in which
the control unit transmits, as the control signal, information regarding a place where power can be supplied to the information processing device owned by the user via the communication unit, in accordance with the accumulated action information of the user.

(11)
The information processing device according to (8) or (9), in which
the control unit transmits, as the control signal, a request signal requesting power supply to the owned device to a movable body capable of power supply via the communication unit, in accordance with the accumulated action information of the user.

(12)

The information processing device according to any one of (1) to (5), in which when the user is estimated to desire a parking lot for a vehicle in which the user is riding, the control unit generates a control signal for preferential use of the parking lot, and transmits the control signal via the communication unit, in accordance with the accumulated action information of the user.

(13)

The information processing device according to (12), in which the accumulated action information of the user detects that, even though there is a parking lot near a destination, a farther parking lot is used.

(14)

The information processing device according to (12) or (13), in which the control unit transmits guidance information to a vacant parking lot in a vicinity of the user to the vehicle via the communication unit, in accordance with the accumulated action information of the user.

(15)

The information processing device according to (12) or (13), in which the control unit transmits a control signal for preferentially guiding the vehicle to a parking lot to a parking lot management system via the communication unit, in accordance with the accumulated action information of the user.

(16)

The information processing device according to any one of (1) to (5), in which when the user is estimated to desire allocation of a bandwidth of a communication device owned by the user, the control unit generates a control signal for preferentially allocating the bandwidth, and transmits the control signal via the communication unit, in accordance with the accumulated action information of the user.

(17)

The information processing device according to (16), in which the accumulated action information of the user is an act of the user connecting the communication device to a kiosk terminal in a wired or wireless manner, and downloading content via the kiosk terminal.

(18)

The information processing device according to (16) or (17), in which the control unit transmits a control signal for providing public communication connection service of higher speed than current communication speed to the communication device to a communication connection service provision system via the communication unit, in accordance with the accumulated action information of the user.

(19)

An information processing method including, by a processor:

receiving, via a communication unit, information obtained by sensing an action of a user;

accumulating, in units of users, action information of indirectly saving resources in a predetermined storage unit on the basis of the information; and performing control, when the user is estimated to desire resources, to generate a control signal for preferentially providing the resources to the user, and transmit the control signal via the communication unit, in accordance with the accumulated action information of the user.

REFERENCE SIGNS LIST 1 sensor device
2 emotion server
3 network
4 information processing terminal
5 resource management service server
10 control unit
11 sensor
12 communication unit
20 control unit
21 communication unit
22 resource correspondence table storage unit
23 saved resource table storage unit
101 action/feeling recognition unit
201 saved resource determination unit
202 registration/update unit
203 resource request recognition unit
204 resource provision determination unit
205 notification information generation unit

The invention claimed is:

1. A first information processing device, comprising:
a communication circuit configured to:
receive information obtained by sensing actions of a plurality of users; and
receive sensing data of a user of the plurality of users, wherein the sensing data indicates at least one of a facial expression of the user, a heart rate of the user, or a perspiration of the user; and
a control circuit configured to:
accumulate, based on the received information, action information of indirectly saving first resources for each user of the plurality of users in a storage unit;
determine a feeling of the user based on the at least one of the facial expression of the user, the heart rate of the user, or the perspiration of the user;
determine that the user desires the first resources based on at least one of the action information or the feeling of the user;
determine whether a resource saving amount corresponding to the accumulated action information associated with the user is equal to or greater than a threshold value, based on the determination that the user desires the first resources;
control, in a case where the resource saving amount is equal to or greater than the threshold value, generation of a control signal to supply the first resources to the user; and
transmit the control signal via the communication circuit to a second information processing device.

2. The first information processing device according to claim 1, wherein in a case where the feeling of the user indicates that the user is in trouble, the control circuit is further configured to determine the first resources desired by the user based on second resources related to the action information of the user.

3. The first information processing device according to claim 1, wherein, in a case where the user desires the first resources, the control circuit is further configured to transmit, to the user via the communication circuit, notification information indicating that the first resources are supplied to the user in accordance with the action information of the user accumulated in the storage unit.

4. The first information processing device according to claim 3, wherein the control circuit is further configured to:
convert the accumulated action information into numerical values;
accumulate the numerical values in the storage unit; and
in a case where the numerical values associated with the user corresponding to the first resources desired by the user satisfies a determined condition, transmit the notification information indicating that the first resources are supplied.

5. The first information processing device according to claim 1, wherein when the user is estimated to desire preferential traveling of specific road by a car, the control circuit is further configured to transmit the control signal to a road management system or an automated driving system via the communication circuit so that the user can preferentially travel the specific road, based on the accumulated action information of the user.

6. The first information processing device according to claim 5, wherein the accumulated action information of the user is a car ridesharing act.

7. The first information processing device according to claim 1, wherein when the user is estimated to desire power supply to an information processing device owned by the user, the control circuit is further configured to:
generate the control signal for preferentially supplying power to the information processing device owned by the user, and
transmit the control signal via the communication circuit, based on the accumulated action information of the user.

8. The first information processing device according to claim 7, wherein the accumulated action information of the user is a stair ascent act or a stair descent act.

9. The first information processing device according to claim 7, wherein the control circuit is further configured to transmit, as the control signal, specific information regarding a place where the power can be supplied to the information processing device owned by the user via the communication circuit, based on the accumulated action information of the user.

10. The first information processing device according to claim 7, wherein the control circuit is further configured to transmit, as the control signal, a request signal requesting power supply to the information processing device owned by the user to a movable body capable of the power supply via the communication circuit, based on the accumulated action information of the user.

11. The first information processing device according to claim 1, wherein when the user is estimated to desire a parking lot for a vehicle in which the user is riding, the control circuit is further configured to:
generate the control signal for preferential use of the parking lot; and
transmit the control signal via the communication circuit, based on the accumulated action information of the user.

12. The first information processing device according to claim 11, wherein the accumulated action information of the user detects that, even though there is a specific parking lot near a destination, a farther parking lot is used.

13. The first information processing device according to claim 11, wherein the control circuit is further configured to transmit guidance information to a vacant parking lot in a vicinity of the user to the vehicle via the communication circuit, based on the accumulated action information of the user.

14. The first information processing device according to claim 11, wherein the control circuit is further configured to transmit the control signal for preferentially guiding the vehicle to the parking lot to a parking lot management system via the communication circuit, based on the accumulated action information of the user.

15. The first information processing device according to claim 1, wherein when the user is estimated to desire allocation of a bandwidth of a communication device owned by the user, the control circuit is further configured to:
generate the control signal for preferentially allocating the bandwidth; and
transmit the control signal via the communication circuit, based on the accumulated action information of the user.

16. The first information processing device according to claim 15, wherein the accumulated action information of the user is an act of the user connecting the communication device to a kiosk terminal in a wired or wireless manner, and downloading content via the kiosk terminal.

17. The first information processing device according to claim 15, wherein the control circuit is further configured to transmit the control signal to provide public communication connection service of higher speed than current communication speed to the communication device to a communication connection service provision system via the communication circuit, based on the accumulated action information of the user.

18. The first information processing device according to claim 1, wherein the control circuit is further configured to determine the resource saving amount corresponding to the action information for each user a saving evaluation rule stored in the storage unit.

19. The first information processing device according to claim 1, wherein the control circuit is further configured to change, based on the supply of the first resources to the user, the resource saving amount by subtraction of the threshold value from the resource saving amount.

20. An information processing method, comprising:
in a first information processing device that includes a communication circuit and a control circuit:
receiving, by the communication circuit, information obtained by sensing actions of a plurality of users;
receiving, by the communication circuit, sensing data of a user of the plurality of users, wherein the sensing data indicates at least one of a facial expression of the user, a heart rate of the user, or a perspiration of the user;
accumulating, by the control circuit, based on the received information, action information of indirectly saving first resources for each user of the plurality of users in a storage unit;
determining, by the control circuit, a feeling of the user based on the at least one of the facial expression of the user, the heart rate of the user, or the perspiration of the user;
determining, by the control circuit, that the user desires the first resources based on at least one of the action information or the feeling of the user;
determining, by the control circuit, whether a resource saving amount corresponding to the accumulated action information associated with the user is equal to or greater than a threshold value, based on the determination that the user desires the first resources;
controlling, by the control circuit, in a case where the resource saving amount is equal to or greater than the threshold value, generation of a control signal for supplying the first resources to the user; and transmitting, by the communication circuit, the control signal to a second information processing device.

* * * * *